(12) United States Patent
Lepretre et al.

(10) Patent No.: US 10,118,354 B2
(45) Date of Patent: Nov. 6, 2018

(54) METHOD FOR CUTTING SEGMENTS FOR TIRE MOLDS

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Jerome Lepretre, Clermont-Ferrand (FR); Patrick Andanson, Clermont-Ferrand (FR); Enrique Segoviano, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 17 days.

(21) Appl. No.: 15/102,124

(22) PCT Filed: Nov. 28, 2014

(86) PCT No.: PCT/IB2014/002591
§ 371 (c)(1),
(2) Date: Jun. 6, 2016

(87) PCT Pub. No.: WO2015/082969
PCT Pub. Date: Jun. 11, 2015

(65) Prior Publication Data
US 2016/0303812 A1    Oct. 20, 2016

(30) Foreign Application Priority Data

Dec. 6, 2013 (FR) ...................................... 13 02850

(51) Int. Cl.
*B29D 30/06* (2006.01)
*B24C 1/04* (2006.01)
(Continued)

(52) U.S. Cl.
CPC .......... *B29D 30/0629* (2013.01); *B23P 15/24* (2013.01); *B24C 1/045* (2013.01);
(Continued)

(58) Field of Classification Search
CPC ......... B23P 15/24; B24C 1/045; B29C 33/38; B29C 33/3842; B29D 2030/0616; B29D 30/0606; B29D 30/0629
See application file for complete search history.

(56) References Cited

U.S. PATENT DOCUMENTS 6,105,951 A * 8/2000 Shibata .................. B23Q 3/067
269/100
2007/0166419 A1   7/2007 Tanaka et al.
(Continued)

FOREIGN PATENT DOCUMENTS

CN         101224541 A  *  7/2008
EP         1529627 A1      5/2005
(Continued)

OTHER PUBLICATIONS

JP 02284824 A Nov. 1990 English Machine Translation.*
CN 101224541 A Jul. 2008 English Machine Translation.*

*Primary Examiner* — Marc Carlson
(74) *Attorney, Agent, or Firm* — Dickinson Wright PLLC

(57) ABSTRACT

Cutting method for cutting a semi-finished molding element to yield segments of a mold for molding and vulcanizing tires is disclosed herein. The said molding element includes a plurality of segments originating from one and the same molding operation, the said molding element also includes at least one pair of male securing members on each side of a
(Continued)

molding face to form the tread patterns in the tread of the tire that is to be molded.

14 Claims, 5 Drawing Sheets

(51) Int. Cl.
*B29C 33/38* (2006.01)
*B23P 15/24* (2006.01)

(52) U.S. Cl.
CPC .......... *B29C 33/38* (2013.01); *B29C 33/3842* (2013.01); *B29D 30/0606* (2013.01); *B29D 2030/0616* (2013.01)

(56) References Cited

U.S. PATENT DOCUMENTS

| | | | |
|---|---|---|---|
| 2008/0084017 | A1 | 4/2008 | Barziza |
| 2011/0151040 | A1* | 6/2011 | Cuny ................ B29D 30/0606 425/47 |
| 2011/0254185 | A1 | 10/2011 | Liew |
| 2015/0037443 | A1* | 2/2015 | Kohara ................ B29D 30/12 425/54 |

FOREIGN PATENT DOCUMENTS

| | | | | |
|---|---|---|---|---|
| EP | 1717003 | A1 | 11/2006 | |
| EP | 2399730 | A1 * | 12/2011 | ......... B29D 30/0606 |
| GB | 2342604 | A | 4/2000 | |
| JP | 02284824 | A * | 11/1990 | |
| JP | H0820026 | A | 1/1996 | |
| JP | 5579292 | B1 * | 8/2014 | ......... B29D 30/0629 |
| WO | 2010/027251 | A2 | 3/2010 | |

\* cited by examiner

METHOD FOR CUTTING SEGMENTS FOR TIRE MOLDS

CROSS-REFERENCE TO RELATED APPLICATIONS

This application is a 371 national phase entry of PCT/IB2014/002591, filed 28 Nov. 28, 2014, which claims the benefit of French Patent Application No. 13/02850, filed 6 Dec. 2013, the contents of which are incorporated herein by reference for all purposes.

BACKGROUND

The present disclosure relates to a method of manufacturing molding elements for molds intended for molding tires provided with a tread comprising a circumferential arrangement of tread patterns. It relates more particularly to a cutting phase aimed at separating a plurality of segments obtained jointly during a molding operation.

The manufacture of tire molds and of components of these molds involves a wide variety of steps, often highly complex, and high production and material costs. Moreover, it is essential that all the components incorporated into the molds can enjoy a high level of accuracy, all this making the operations of designing and producing molds particularly tricky.

In order to optimize the processes without quality being adversely affected, all the parts that make up the molds and all the intermediate steps and operations need to be considered.

There is therefore still a need to optimize the process for producing the molds and the various elements that make up the molds, while at the same ensuring a high level of molding quality and a high level of flexibility in the methods of manufacture.

Document GB 2342604 is, moreover, known and describes a workpiece positioning jig for machine tools. This jig comprises a mounting body comprising a positioning part intended to be brought into contact with a workpiece and a bearing portion projecting downwards. A vertical rod extends through the positioning part and the bearing portion. At its lower end, this rod has a U-shaped reinforcing element.

Document JP 19940149993 relates to a mold with components that are very hard, very durable and simple to maintain. A plurality of elements are mounted in a support sector to constitute a segment. The parts are arranged contiguously so that the respectively adjacent faces of the parts are in contact with one another.

Document EP2399730 describes a mold in which a block is firmly secured, and which can be removed even after it has been used. This tire mold comprises a cavity surface formed in an interior surface of the mold. This mold comprises a block that has a plurality of platelike elements which are aligned with slots formed between each of the plates. The mold also comprises a support which contains a recess allowing the block to be fitted, and a securing element which is secured removably to the block and mounted in the recess.

Document US2008/0084017 relates to blocks which are assembled to provide a plurality of securing points so as to allow them to be secured to a table of a milling machine and to other blocks so as to allow various clamping options around the workpiece. Moreover, clamps, fasteners, blocks and T-nuts and various clamping tools can be used. No additional mounting plate or any other type of preparatory hardware is required for mounting all of the blocks on the milling table or any other work table on which a block securing space is provided.

In these documents, despite the diversity of the solutions put forward, not one allows the manufacture of tire mold segments to be optimized by taking into consideration on the one hand the requirements placed on the mold itself and, on the other hand, the multiple and varied requirements regarding the tires that are to be molded.

SUMMARY

It is an object of the disclosure to manufacture tire mold segments economically, very accurately, while at the same time minimizing waste.

It is another object of the disclosure to provide a method of manufacture that makes it possible to reduce raw material wastage when making modifications to the visual characteristics of the tires.

Yet another object is to provide a method that allows tire manufacture to be optimized, particularly at the mold preparation stage.

In order to achieve this, the disclosure provides a cutting method for cutting a semi-finished molding element intended to yield segments of a mold for molding and vulcanizing tires, the said molding element comprising a plurality of segments originating from one and the same molding operation, the said molding element comprising at least one pair of male securing members on each side of a molding face intended to form the tread patterns in the tread of the tire that is to be molded, the said method comprising the following steps:
aligning and indexing the semi-finished molding element on the securing support using indexing references;
clamping the semi-finished molding element on a securing support provided with female securing members corresponding to those of the molding element, by means of the male and female securing members;
placing the securing support on a cutting machine;
cutting the segments using the cutting machine.

The method is particularly advantageous in achieving accurate positioning of the molding element, so that the cuts can be made accurately, from the starting point of a correct indexing of the workpiece and of the cutting zones.

According to one advantageous embodiment, the male securing members are studs comprising dovetail-shaped cutouts extending radially towards the inside of the molding elements.

According to another advantageous embodiment, the female securing members comprise dovetail-shaped cutouts extending radially towards the inside of the molding elements.

Configuring the securing members with complementary dovetail shapes afford excellent retention of the secured workpiece.

According to one advantageous alternative form of embodiment, the indexing references of the securing support comprise at least two indexing blocks provided with an indexing notch that is accurately located with respect to the support.

Advantageously, the indexing references of the semi-finished molding element comprise an indexing finger to be inserted into the notch of the indexing block that indexes the support.

This then in a simple, reliable and economic way makes it possible to obtain indexing means that afford a good level of accuracy. As an alternative, the indexing fingers have different sizes and/or shapes on each side, so as to allow them to be positioned only one way round.

According to one advantageous embodiment, the cutting is performed using a very high pressure water jet.

According to an advantageous embodiment, the method moreover comprises a machining step, following the cutting step, in which machining step the surplus material between the segments is removed. During a step of machining a segment, the latter is secured to a machine tool by means of securing members provided with dovetail-shaped cutouts.

The disclosure also provides a securing support for implementing the cutting method described hereinabove, comprising a holding frame, at least two indexing blocks provided with bearing surfaces and with indexing notches, and at least two female securing members able to collaborate with corresponding male securing members belonging to the molding element.

Advantageously, the female securing members have dovetail-shaped cutouts.

The disclosure finally provides a semi-finished molding element intended to yield segments of a mold for molding and vulcanizing tires, and comprising:
a molding face comprising patterns intended for molding the tread patterns of a tire tread;
securing members on each side of the molding face;
indexing elements;
a plurality of segments intended to be cut from one another using the cutting method described hereinabove.

In one advantageous embodiment, each segment comprises a pair of securing members which is intended for individually securing each segment to a machine tool for a post-cutting machining step.

Thus, before cutting, the molding element is provided with a plurality of pairs of securing members, one of which is intended to secure the said molding element to the support of the cutting machine. After the segments have been cut, each of them bears one pair of securing members, for attaching each segment to a machine tool.

According to yet another advantageous embodiment, each segment comprises a pair of reference surfaces which are intended to collaborate with the bearing surfaces of the indexing blocks.

BRIEF DESCRIPTION OF THE FIGURES

Further features and advantages of the disclosure will become apparent from the following description, given by way of nonlimiting example, with reference to the attached drawings in which.

In the description which will follow, elements which are substantially identical or similar will be noted by identical references.

DETAILED DESCRIPTION

A "tire" means all types of resilient tread whether or not it is subjected to an internal pressure.

The "tread" of a tire means a quantity of rubber compound delimited by lateral surfaces and by two main surfaces, one of which is intended to come into contact with the ground when the tire is driven on.

A "tread pattern" means the surface and volume arrangements of rubber compounds at the external surface of the tire which are intended to provide contact with the running surface, and the shape of which makes it possible to adjust the operational performance of the tire. The tread patterns also allow the tread or some other zone of the tire such as the sidewalls to be given an attractive appearance.

A "mold" means a collection of separate molding elements which, when brought closer together, make it possible to define a toroidal molding space in which a tire can be vulcanized and molded.

Figure 3:
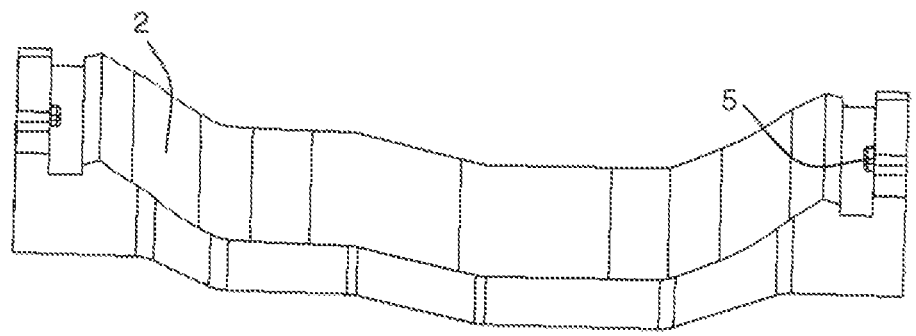
FIG. 3 is a schematic perspective view of one example of a segment after cutting.

FIG. 3 illustrates one example of a segment 2 used in a mold used for molding and vulcanizing tires. Such a segment, of substantially elongate shape, comprises, at each of its ends, a male securing member 3 having a dovetail-shaped cutout, best visible in the perspective view of FIG. 4.

The use of this type of segment in a tire molding and vulcanizing method allows a great deal of flexibility in the configuring of the molds. Specifically, it is possible to plan for a segment to correspond to a pattern element of the tread of the tire that is to be molded. By using molding elements with different pattern elements, the design of the tread can be adapted or modified without the need to replace the entire mold.

Figure 1:
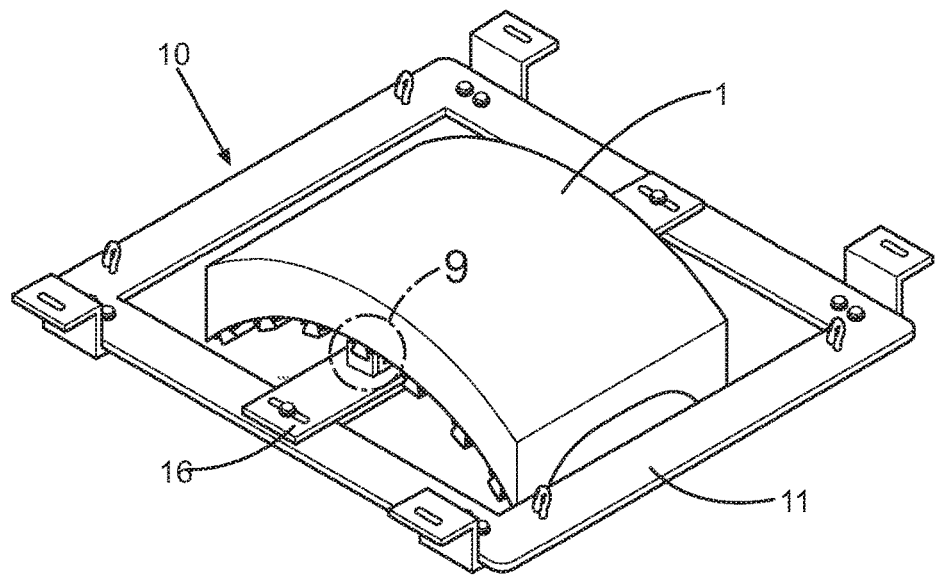
FIG. 1 is a schematic perspective view of the main elements used for securing a semi-finished molding element so as to allow one or more operations of cutting apart segments intended for tire molds.

Moreover, the simultaneous manufacture of a plurality of molding elements makes it possible to optimize the manufacturing process, simplifying the tooling and reducing the waste. To manufacture these segments economically, a semi-finished molding element 1 like the one illustrated in the example of FIG. 1, is produced first of all, by molding. Such a semi-finished molding element comprises a plurality of segments 2 that need to be separated from one another. In what follows, the proposed method recommends cutting where two adjacent segments meet, as many times as necessary, according to the number of segments. The cutting phase can be carried out using one or more very high pressure water jets, or using any means that allows cutting to be performed accurately, quickly, and repeatably.

After the cutting operations, machining operations allow the portions of material not needed for the molding operations to be removed and potentially the creation of additional zones on the segments.

In order to achieve the level of accuracy required for the cutting, it is absolutely essential that the semi-finished molding element 1 and the cutting planes can be referenced, that the cutting tools can be positioned accurately with respect to these cutting planes and, above all, to ensure that the molding element is secured very firmly in order to withstand the numerous and intense mechanical stresses generated by the cutting operations.

Figure 2:
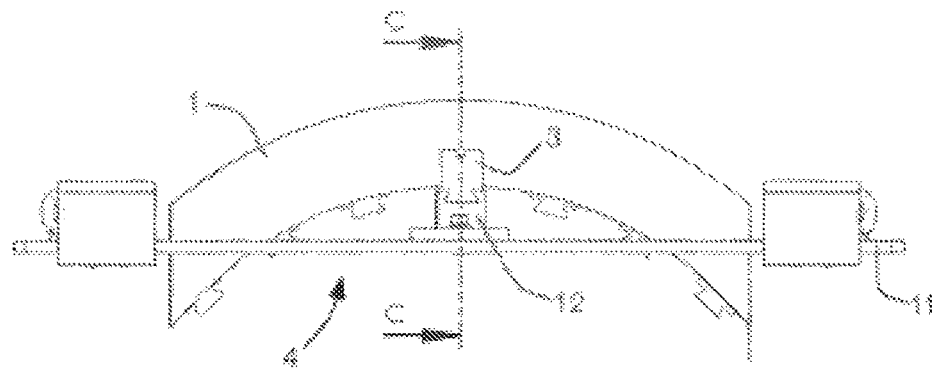
FIG. 2 is a schematic face view of the elements of FIG. 1.

The disclosure proposes the use of a securing support 10 like that illustrated for example in FIGS. 1 and 2. The securing support 10 comprises a holding frame 11 on which the semifinished molding element 1 is positioned and indexed so that the cuts made can be aligned as accurately as possible with the cutting planes. The securing frame illustrated has a substantially square profile. At the middle of one of the sides, an indexing bar 16 (shown in detail in FIG. 7) is secured to the frame 11. In the example illustrated, two female securing members 12 are provided, namely one on each side of the molding element 1, opposite the male securing members 3 of the molding element 1. The two female securing members 12 are fixed to the bar 16, one of them via the interposition of longitudinal guideways, so that the female securing means 12 can be positioned longitudinally at the correct location, according to the directions of the molding element 1.

Figure 5:
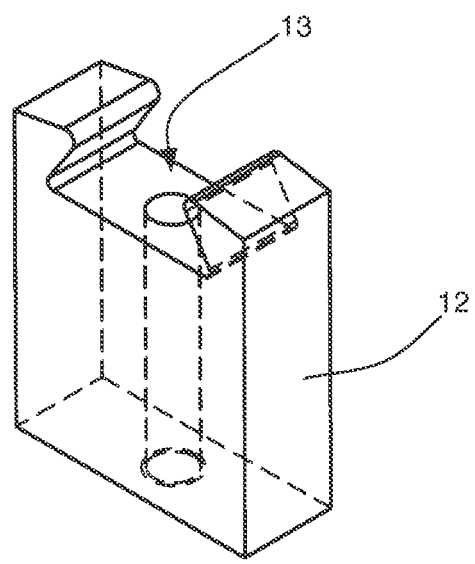
FIG. 5 is a schematic perspective view of one example of a female securing member.
Figure 6:
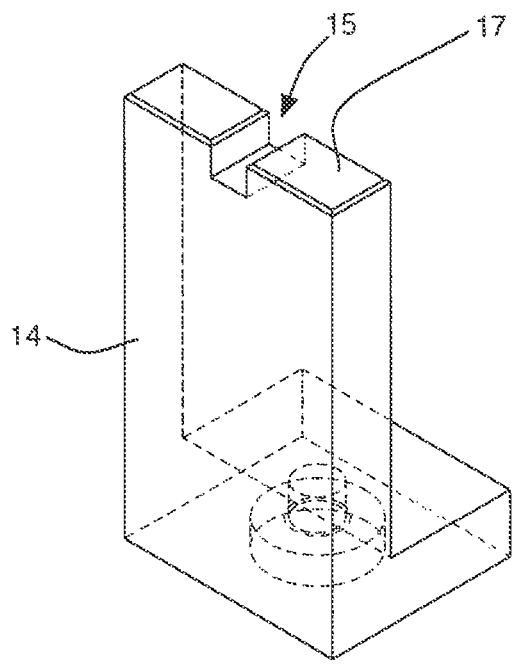
FIG. 6 is a schematic perspective view of one example of an indexing block.

FIG. 5 shows one example of a female securing member 12 provided with a dovetail-shaped cutout 13 at one of its ends.

The semi-finished molding element 1 is placed on the holding frame 11 with the molding face 4 towards the frame. This arrangement makes it possible to envisage clamping the molding element 1 through the use of the male securing members 3. The complementary dovetail-shaped profiles allow the secured workpiece to be slotted into position accurately and firmly, affording good resistance to the axial and transverse forces so that the respective components maintain their correct positioning throughout the process of cutting the segments 2 apart, this process being liable to generate high forces.

Figure 4:
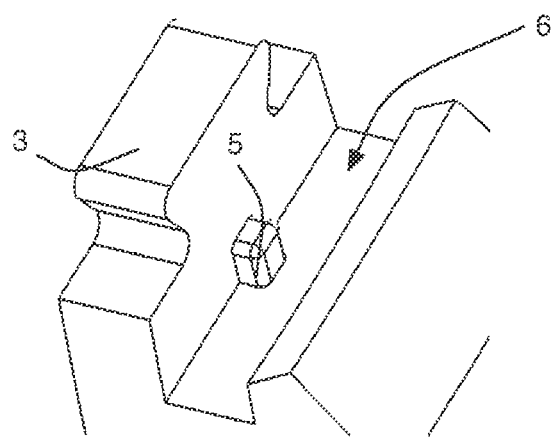
FIG. 4 is an enlarged schematic depiction of FIG. 3, more particularly showing a segment securing member.
Figure 7:
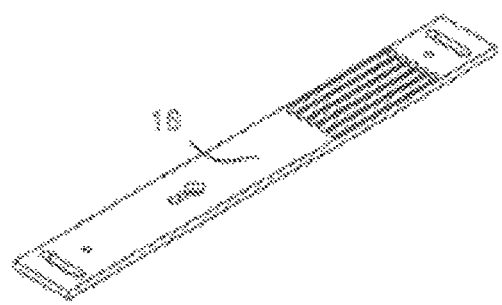
FIG. 7 shows one example of an indexing bar.
Figure 8:
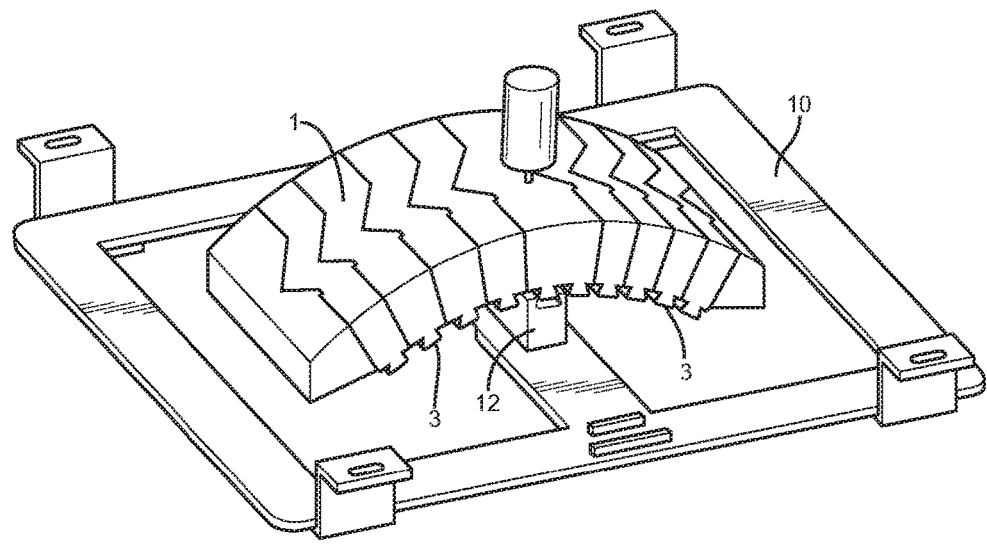
FIG. 8 shows one example of a cutting phase using a very high pressure water jet machine.
Figure 9:
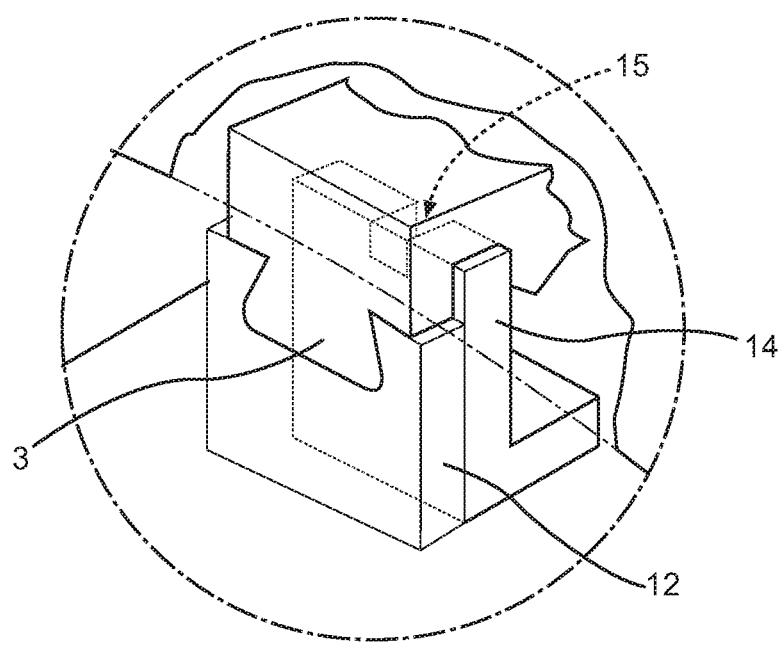
FIG. 9 is an enlarged view of a portion of FIG. 1 and showing the semi-finished molding element being partially broken away to reveal the indexing block and the indexing bar.

FIG. 4 is an enlarged perspective view of one example of an indexing finger 5 placed against the base of a male securing member 3, also visible in FIG. 3. The indexing fingers make it possible to envisage accurate positioning of the segments, either during the cutting phase and/or during a subsequent phase of molding vulcanizing in a tire mold provided with a plurality of circumferentially aligned segments. FIGS. 7 and 8 illustrate one example of an indexing block 14 provided with an indexing notch 15 corresponding to a finger 5. A block 14 is advantageously arranged at each end of the segment, preferably adjacent to the male securing members via which the molding element is fixed to the holding frame 11. The fingers 5 and notches 15 on each side of one and the same segment may have different shapes and/or sizes so as to ensure mounting just one way round if that is required.

The Method

By virtue of the securing support described hereinabove, a cutting method for cutting a semi-finished molding element 1 can be performed optimally. According to the method of the disclosure, the semi-finished molding element 1 is clamped to the securing support 10 by means of the corresponding male 3 and female 12 securing members. The indexing references 14 and 15 allow the semi-finished molding element 1 to be aligned and indexed on the securing support 10. The reference surface 6 on each side of each segment allows the element to bear, correctly positioned, on a bearing surface 17 of the indexing references 14. Once the molding element 1 is in place on the support 10 with the clamping means engaged in one another, with the molding element correctly aligned with respect to the support, the assembly is placed on a specially adapted cutting machine, preferably a very high pressure water jet cutting machine.

The segments 2 are then cut apart very effectively and reliably because of the firm clamping of the element that is to be cut which is able to withstand the forces caused by the cutting without the risk of becoming misaligned or detached. FIG. 8 shows an example of cutting using a nozzle spraying a jet of water (advantageously containing abrasive particles such as sand) along the cutting lines between the segments.

To make multiple cuts easier, these are preferably made in such a way as to leave a zone or layer of material between the cut segments. This layer is enough to allow the molding element 1 overall to maintain its initial curved shape throughout the cutting operations. However, the quantity of material kept is thin enough that the segments can easily be separated from one another after they have been detached from the support of the cutting machine.

The invention claimed is:

1. A method for curing a semi-finished molding element to yield segments of a mold for molding and vulcanizing tires, the semi-finished molding element having a plurality of segments originating from a same molding operation, the semi-finished molding element having at least one pair of male securing members on each side of a molding face to form tread patterns in a tread of the tire that is to be molded, the male securing members being studs comprising dovetail-shaped cutouts which extend radially towards the inside of the molding element, said method comprising the following steps:
   aligning and indexing the semi-finished molding element on a securing support using indexing references;
   clamping the semi-finished molding element on the securing support provided with female securing members corresponding to those of the molding element, using the male securing members and the female securing members;
   placing the securing support on a cutting machine; and
   cutting the segments using the cutting machine.

2. The method according to claim 1, in which the female securing members comprise dovetail-shaped cutouts extending radially towards the inside of the molding elements.

3. The method according to claim 1, in which the indexing references of the securing support comprise at least two indexing blocks provided with an indexing notch that is accurately located with respect to the securing support.

4. The method according to claim 3, in which the indexing references of the semi-finished molding element comprise an indexing finger to be inserted into the indexing notch of the indexing block that indexes the securing support.

5. The method according to claim 4, in which the cutting of the segments is performed using a very high pressure water jet.

6. The method according to claim 5, further comprising a machining step, following the cutting step, in which surplus material between the segments is removed.

7. A securing support for cutting a semi-finished molding element, comprising:
   a holding frame, at least two indexing blocks provided with bearing surfaces and with indexing notches, and at least two female securing members able to collaborate with corresponding male securing members belonging to the semi-finished molding element; and
   wherein the at least two female securing members have dovetail-shaped cutouts.

8. A semi-finished molding element to yield segments of a mold for molding and vulcanizing tires, comprising:
   a molding face including patterns for molding tread patterns of a tire tread;
   male securing members on each side of the molding face, the male securing members comprising dovetail-shaped cutouts;
   indexing elements; and a plurality of segments cuttable from one another using a cutting method, wherein the cutting method is performed by:
aligning and indexing the semi-finished molding element on a securing support provided with female securing members corresponding to those of the semi-finished molding element, using the male securing members and the female securing members;
placing the securing support on a cutting machine; and
cutting the segments using the cutting machine.

9. The semi-finished molding element according to claim 8, in which each segment comprises a pair of securing members individually securable to each segment of a machine tool for a post-cutting machining step.

10. The semi-finished molding element according to claim 8, in which each segment comprises a pair of reference surfaces collaborated with bearing surfaces of indexing blocks.

11. A method for curing a semi-finished molding element to yield segments of a mold for molding and vulcanizing tires, the semi-finished molding element having a plurality of segments originating from a same molding operation, the semi-finished molding element having at least one pair of male securing members on each side of a molding face to form tread patterns in a tread of the tire that is to be molded, the method comprising the following steps:

aligning and indexing the semi-finished molding element on a securing support using indexing references, the indexing references comprising at least two indexing blocks provided with an indexing notch that is accurately located with respect to the support, and the indexing references comprising an index finger to be inserted into the indexing notch of the indexing block that indexes the securing support;
clamping the semi-finished molding element on the securing support provided with female securing members corresponding to those of the semi-finished molding element, using the male securing members and the female securing members;
placing the securing support on a cutting machine; and
cutting the segments using the cutting machine.

12. The method according to claim 11, in which the cutting of the segments is performed using a very high pressure water jet.

13. The method according to claim 12 further comprising a machining step, following the cutting step, in which surplus material between the segments is removed.

14. The method according to claim 13, in which, during the step of machining the segments, the latter is secured to a machine tool using securing members provided with dovetail-shaped cutouts.

* * * * *